United States Patent [19]
Ip

[11] Patent Number: 5,777,226
[45] Date of Patent: Jul. 7, 1998

[54] SENSOR STRUCTURE WITH L-SHAPED SPRING LEGS

[75] Inventor: Matthew W. Ip. Austin, Tex.

[73] Assignee: I/O Sensors, Inc., Austin, Tex.

[21] Appl. No.: 871,591

[22] Filed: Jun. 9, 1997

Related U.S. Application Data

[63] Continuation of Ser. No. 516,501, Aug. 17, 1995, abandoned, which is a continuation-in-part of Ser. No. 218,525, Mar. 28, 1994, abandoned.

[51] Int. Cl.$^6$ .................................................. G01P 15/13
[52] U.S. Cl. ............................... 73/514.24; 73/514.38
[58] Field of Search ......................... 73/514.16, 514.18, 73/514.23, 514.24, 514.32, 514.33, 514.35, 514.38, 862.61, 862.626

[56] References Cited

U.S. PATENT DOCUMENTS

| | | | |
|---|---|---|---|
| 4,021,766 | 5/1977 | Aine | 29/592.1 |
| 4,071,838 | 1/1978 | Block | 73/577 R |
| 4,144,516 | 3/1979 | Aine | 29/592.1 |
| 4,553,436 | 11/1985 | Hansson | 73/514.33 |
| 4,597,003 | 6/1986 | Aine et al. | 73/514.38 |
| 4,641,539 | 2/1987 | Vilimek | 73/514.33 |
| 4,679,434 | 7/1987 | Stewart | 73/514.18 |
| 4,901,570 | 2/1990 | Chang et al. | 73/514.38 |
| 4,922,756 | 5/1990 | Henrion | 73/514.18 |
| 4,930,042 | 5/1990 | Wiegand | 361/280 |
| 5,000,817 | 3/1991 | Aine | 73/514.24 |
| 5,121,180 | 6/1992 | Beringhause et al. | 73/514.34 |
| 5,134,881 | 8/1992 | Henrion et al. | 73/514.38 |
| 5,209,117 | 5/1993 | Bennett | 73/577 R |
| 5,261,277 | 11/1993 | Thomas | 73/577 R |
| 5,412,986 | 5/1995 | Beringhause et al. | 73/514.33 |
| 5,484,073 | 1/1996 | Erickson | 216/2 |
| 5,487,305 | 1/1996 | Ristic et al. | 73/514.34 |
| 5,576,483 | 11/1996 | Bonin | 73/862.626 |
| 5,652,384 | 7/1997 | Henrion et al. | 73/514.24 |

OTHER PUBLICATIONS

Proceedings of The IEEE, vol. 70, No. 5, May, 1982, Petersen, Kurt E., *Silicon as a Mechanical Material*.

Proceedings of the IEEE, vol. ED–25, No. 10, Oct. 1978; Bassous, Ernest; *Fabrication of Novel Three–Dimensional Microsturctures by the Anisotopic Etching of (100) and (110) Silicon*.

Scientific American, Apr. 1983; Angell, James B., Terry, Stephen C., and Barth, Phillip W.; *Silicon Micromechanical Devices*.

IEEE Publication 0018–9383/79/1200–1911, 1979; Roylance, Lynn M. and Angell, James B.; *A Batch–Fabricated Silicon Accelerometer*.

IEEE Publication CH278–9/90/000–0153, 1993: Henrion, Wo, DiSanza, Len; Ip, Matthew; Terry, Stephen; & Jerman, Hall; *Micro–Machined Accelerometer*.

*Primary Examiner*—John E. Chapman
*Attorney, Agent, or Firm*—Bush, Riddle, & Jackson, L.L.P.

[57] ABSTRACT

A sensor structure (10) has a central mass (16) mounted within a support structure comprising an outer frame (18) with upper and lower covers (12, 14). Eight L-shaped or elbow-shaped ribbon springs are fit about the corners (28) of the mass (16) to allow mass (16) for movement from a reference position with respect to the support structure. One leg of each spring is connected to the middle of an associated side (26A) of the mass (16) while the other leg is connected to the outer frame (18). According to an alternative embodiment, each of the springs (72) is characterized by a relatively larger width at spring-mass connection point (74) and at spring-support connection point (73) and a relatively smaller width at an elbow-bend region between connection points. Narrow gaps G, G' and G" between spring and support, spring and mass and spring and adjacent springs provide lateral stops such that the spring laterally contacts the support or the mass or in adjacent spring before it breaks in response to extremely large lateral forces in the structure. The sensor structure is designed for use as a sensing mechanism in an electrostatic accelerometer arrangement.

13 Claims, 4 Drawing Sheets

SENSOR STRUCTURE WITH L-SHAPED SPRING LEGS

REFERENCE TO RELATED APPLICATION

This application is a Continuation application of Continuation-In-Part application Ser. No. 08/516,501 filed on Aug. 17, 1995, now abandoned, of parent application Ser. No. 08/218,525 filed on Mar. 28, 1994 now abandoned which application has been continued as application Ser. No. 08/635,039 filed on Apr. 17, 1996 now U.S. Pat. No. 5,652,384. A related application filed also on Mar. 28, 1994 issued on Jan. 16, 1996 as U.S. Pat. No. 4,484,073. All such applications and patent are owned by a common assignee.

BACKGROUND OF THE INVENTION

1. Field of the Invention

This invention relates generally to a spring-mass-support sensor structure in which the displacement of the spring supported mass may be sensed electrostatically or by other means to provide a signal proportional to such displacement.

2. Description of Prior Art

Silicon sensing devices have been constructed with a spring-mass-support structure. For example, U.S. Pat. No. 4,922,756 dated May 8, 1990 to Henrion shows a silicon accelerometer in which a spring-mass-support structure has a sensing mass connected to a supporting frame by a plurality of E-shaped leaf springs made of silicon dioxide. Each of the leaf springs includes a base with two integral outer legs and an integral inner leg. The inner leg is connected to the mass while the outer legs are connected to the frame. Displacement of the mass relative to the frame is measured by suitable electronic circuitry which can provide an analog or digital representation of the magnitude of the force applied to the accelerometer.

U.S. Pat. No. 4,641,539 dated Feb. 10, 1987 to Vilimek shows a mass (called a force takeup element) connected by four spring support legs to the support structure. The support legs extend in a direction parallel to the adjacent edge of the mass and have one end connected to the edge adjacent to a corner of the mass. The other stationary end of each leg is connected to the support structure. The support legs are thin leaf-spring like strips which deform upon displacement of the mass.

U.S. Pat. No. 4,553,436 dated Nov. 19, 1985 to Hansson discloses a silicon accelerometer in which a central mass is connected at its corners by four thin, flexible spring legs secured to an outer frame. The legs extend in a single direction parallel to the mass. Each leg has an end connected at right angles to a side of the mass adjacent to a corner, and the stationary ends of the legs are connected to the outer frame.

U.S. Pat. No. 4,144,516 to Aine dated Mar. 13, 1979 discloses a dual leaf spring transducer in which a pair of E-shaped leaf springs are connected between a central mass and an outer support structure. The E-shaped leaf springs are mounted in mutually opposed relation so that the leaf spring structures are coupled together for deflection in unison relative to the surrounding support structures in response to deflection of the mass with respect to the support structure.

In designing a spring-mass-support sensor, it is desired that the spring members, disposed between the mass and its adjacent support structure, be highly unresponsive to forces from directions orthogonal to the measurement axis and will not buckle when lateral forces are applied to the sensor. It is further desired that the measurement of acceleration be extremely linear and that the stress on the springs be minimal. Many of the prior art spring-mass-support sensors, however, are quite sensitive to accelerations or angular motions which are in the plane of the mass, and the springs of such prior art tend to buckle or break in response to high lateral forces. Also, many prior art spring-mass-support designs do not have sufficient linearity in measurement and minimization in spring stress.

IDENTIFICATION OF OBJECTS OF THE INVENTION

It is an object of this invention to provide a spring-mass-support structure intended for use with electrical circuitry as a sensor for acceleration measurement along a measurement axis, with very low distortion and minimal cross-axis sensitivity.

A further object of this invention is to provide a spring-mass-support structure in which mass supporting springs have a high degree of mechanical symmetry and will not buckle during operation.

A still further object of this invention is to provide a spring-mass-support structure for measuring acceleration, or other motion attributes, with a high degree of linearity with respect to forces applied along its measurement axis.

Another object of the invention is to provide a spring-mass-support structure in which springs will not break or buckle when the structure is subjected to high lateral forces.

SUMMARY OF THE INVENTION

The objectives identified above as well as other features and advantages of this invention are incorporated in a device comprising a support structure connected to a central mass by spring members. The spring members are L-shaped or elbow-shaped, thin, flexible, ribbon-like springs fitting in a gap between the central mass and the outer frame of the support structure. The terms L-shaped and elbow-shaped are intended to identify the shape of a spring having two legs at approximately right angles to each other. The central mass is preferably rectangular in shape, although it may be of other shapes, such as square or circular. The term rectangular in shape is intended to describe the shape of the top and bottom surfaces of the mass. The outer frame, which fits about the central mass, is also preferably rectangular in shape for receiving, in spaced relation, the central mass therein. Similarly, the outer frame may be of other shapes.

A pair of top and bottom L-shaped or elbow-shaped spring members are mounted about each actual or virtual corner of the mass. One leg of each spring member is secured at its end to the mass at about the middle of an edge of the mass. The other leg of each spring member is secured at its end to the outer frame at about the middle of an edge of the outer frame. As a result, eight L-shaped or elbow-shaped spring members (four on top and four on bottom) are mounted about the actual or virtual corners of the mass, thereby providing mechanical symmetry to the mounting of the mass.

Because of the special characteristics of the L-shaped or elbow-shaped springs and their symmetrical mounting, the effects of cross-axis forces which may be exerted against the device are minimized. According to an alternative embodiment of the invention, each of the springs is characterized by a relatively larger width at its spring-mass connection point and at its spring-support connection point and relatively smaller width at an intermediate distance between such connection points. Narrow gaps between spring and support, spring and mass and spring and adjacent springs provide lateral stops such that the spring laterally contacts the support or the mass or an adjacent spring before it breaks in response to extremely large lateral forces on the structure.

A controlled aspect (width/thickness) ratio for each spring is provided to prevent buckling of such springs when subjected to high lateral forces. This alternative spring geometry (1) increases resistance to lateral force, (2) minimizes buckling, and (3) provides very small gaps between spring-mass and spring support so as to allow the sensor structure to withstand lateral shocks of over 5000 g without sacrificing any vertical sensing performance.

DESCRIPTION OF THE PREFERRED EMBODIMENTS OF THE INVENTION

Figure 1:
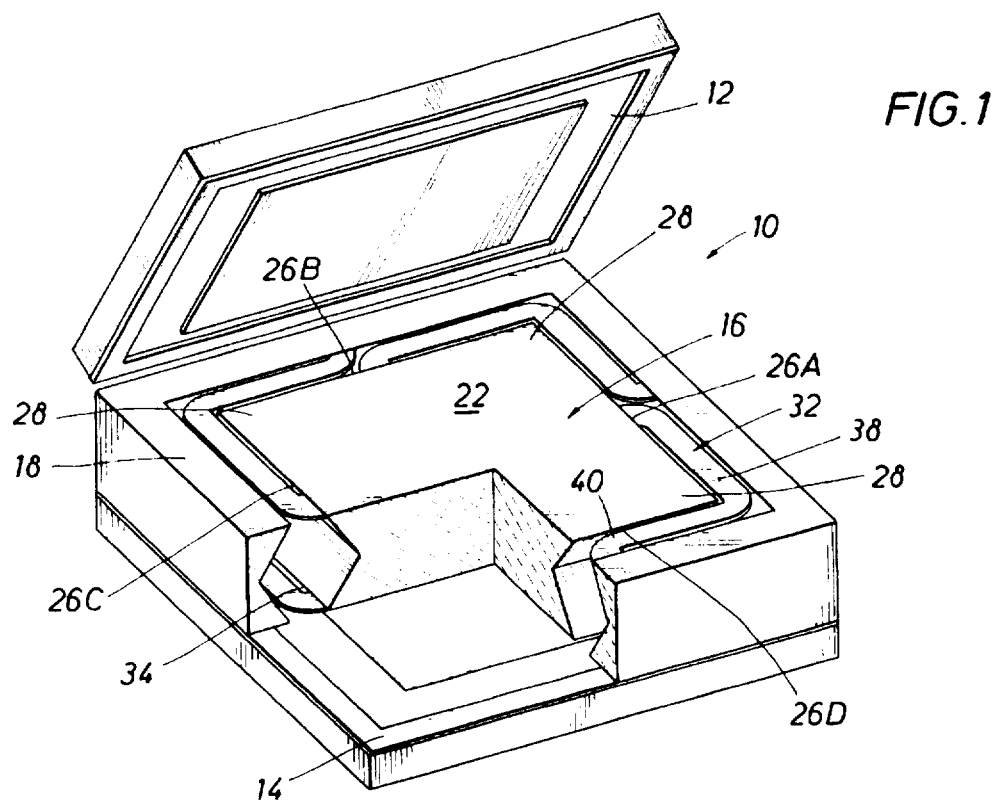
FIG. 1 is an exploded perspective view of the sensor assembly of the present invention and illustrates a spring mounted central mass within an outer frame.
Figure 2:
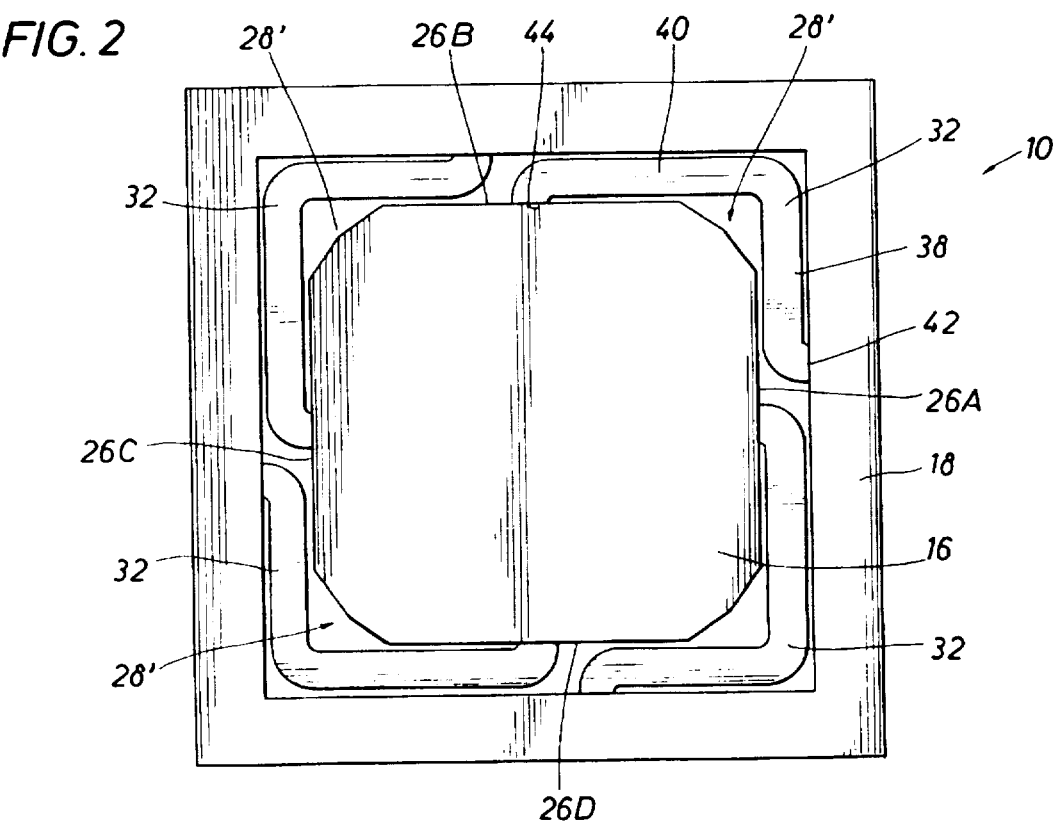
FIG. 2 is a top view of the sensor assembly with central mass, spring and outer frame as shown in FIG. 1, and shows a first preferred embodiment of elbow-shaped springs connected between the central mass and the outer frame.

In FIG. 1, a sensor assembly 10 for use with electrical circuitry to form an accelerometer, or other motion sensing device, is shown. Sensor assembly 10 can be formed from wafers of a nonmetallic monocrystalline material such as silicon, germanium, quartz, gallium arsenide, gallium phosphate, etc. Sensor assembly 10 has a body including a top cover 12, a bottom cover 14, a central mass 16, and a generally rectangular frame 18 for receiving central mass 16 therein between covers 12 and 14. Central mass 16 has a thickness of about 1000 microns or smaller with an upper surface 22 and a lower surface 24, preferably of square or rectangular shape. The corners of such surfaces, however, may be rounded a small amount or even a large amount such that the surfaces become generally circular in shape, as shown in FIG. 2. The top and bottom surfaces 22, 24, are substantially parallel. The sides 26A, 26B, 26C and 26D of mass 16 between surfaces 22 and 24 are of a concave V-shape and intersect each other at actual corners 28 (FIG. 1) or virtual corners 28' (FIG. 2). Sides 26A–26D have upper and lower edges at respective upper and lower surfaces 22, 24. Mass 16 is spaced at 30 (see FIG. 3) about its entire peripheral surface from adjacent frame 18 to define an open or void area therebetween.

A first preferred spring structure, provided between mass 16 and frame 18, includes four upper spring members 32 and four superjacent lower spring members 34. Such first preferred spring structure is illustrated in FIG. 2. Although the legs are of unequal length, such legs may be of almost the same length where connections to the mass and frame are both near the center line of the mass and the frame. Spring members 32 and 34 fit about corners 28 of mass 16 with upper spring members 32 connected to the upper edge of mass 16 adjacent upper surface 22 and lower spring members 34 connected to the lower edge of mass 16 adjacent lower surface 24.

As all spring members 32, 34 are substantially identical, only one spring member 32 is described in detail. Spring member 32 is a L-shaped, thin, flexible, ribbon-like spring which extends about and around a corner 28 or virtual corner 28' of mass 16. As shown in FIG. 2, the spring member 32 includes a relatively shorter leg 38 and an integral somewhat longer leg 40. Although a first preferred embodiment is shown in FIG. 2, leg 38 could be designed to be longer or shorter than leg 40. End 42 of leg 38 is secured perpendicularly to frame 18 at the middle of an adjacent side of frame 18. End 44 of leg 40 is secured perpendicularly to side 26B at the middle as shown in FIG. 2.

Mass 16 is restrained by four upper springs 32 and four superjacent lower springs 34. When a force is applied perpendicularly to surfaces 22, 24, mass 16 along with springs 32, 34 is displaced inwardly to or outwardly from the paper with respect to the illustration of FIG. 2. Springs 32, 34 deform linearly with input force applied perpendicularly to surfaces 24. The linear relationship between the deformation of the springs and the input force within a certain frequency range enables an accurate measurement of a variable related to the force, for example acceleration, by measuring the displacement of mass 16 from its rest position.

Several design features contribute to high linearity and other desirable characteristics of the spring-mass-support structure. First, the length of each spring is significantly longer than the displacement distance in which mass 16 travels. In the first preferred embodiment of FIG. 2 of the spring structure of the sensor, the length of each spring is about 3000 μm or greater while the displacement distance that mass 16 travels during measurement is about 1 μm or less. Accordingly, a large ratio of the spring length to mass displacement distance ensures linearity during measurement. Such ratio should be at least 100 while 3000 or higher is desired.

Second, a balanced spring placement scheme provided with four springs on top and four springs on the bottom, connecting mass 16 to frame 18.

Third, eight springs are positioned in a way which allows mass 16 to rotate a small angular distance when mass 16 is displaced. Such rotation relieves tensile stress, which will otherwise be transmitted to the springs. Preferably such stress should be negligible.

Fourth, the springs are made of the same material as mass 16 and frame 18. The use of uniform material during processing minimizes residual stress on the springs caused by processing and stress induced during operating of the structure.

Vertical stops 45 (see FIG. 3), which extend from covers 12 and 14, serve to limit the movement of mass 16 in order to prevent springs 32, 34 from reaching critical elastic limits when large vertical shock forces are encountered by the sensor assembly 10. By limiting the movement of mass 16, vertical stops 45 also serve to prevent electrostatic and mechanical latch-up which may occur when electrodes on mass 16 and complementary electrodes on covers 12, 14 are placed too close together.

Lateral stops (not illustrated) may be provided on frame 18 adjacent springs 32, 34 for protecting the sensor assembly 10 from lateral shock forces. However, the L-shaped spring design of the invention inherently protects the sensor assembly 10 from lateral shock forces, thereby eliminating the need for lateral stops. If extremely large lateral shocks are anticipated, lateral stops can be added as specifically illustrated below in an alternative arrangement of FIG. 5.

The design features described above contribute to a sensor design, which inherently is resistant to lateral shock. The sensor is characterized by lateral shock resistance because (1) minimal residual stress is in the springs because of the use of uniform material during processing (as discussed above), (2) eight springs are strategically placed in a balanced arrangement at separate corners, and (3) the springs are provided with rounded corners and an aspect ratio (that is, ratio of width to thickness) which is relatively low.

Figure 5:
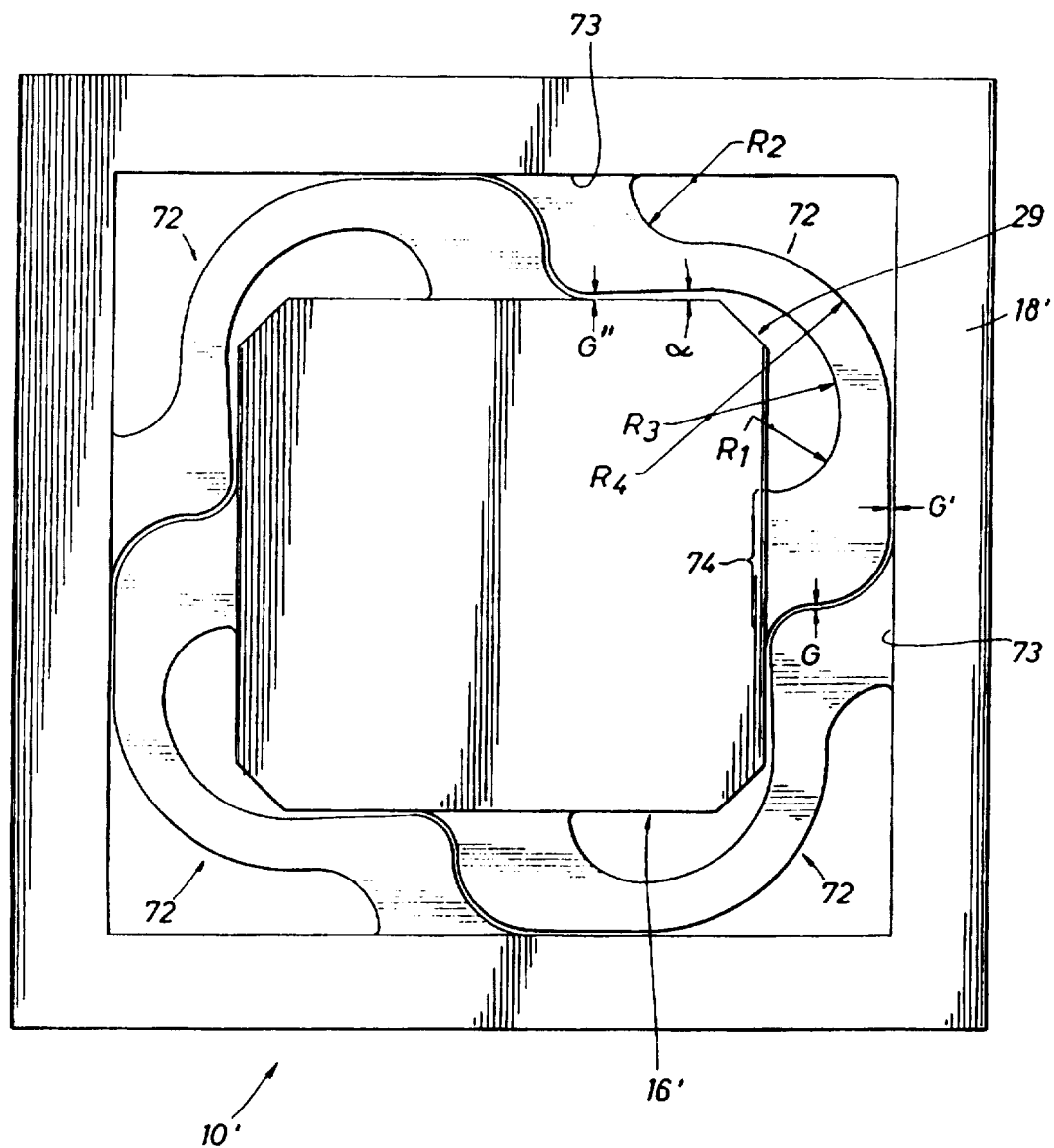
FIG. 5 is an illustration of an alternative preferred embodiment of elbow-shaped springs connected between the central mass, and the outer frame.

An alternative embodiment of the invention is illustrated in FIG. 5. The changes in the spring structure of the sensor of FIG. 5, as compared to the spring structure of FIG. 2, extend the capability of the sensor to withstand higher lateral forces. Such lateral forces are called "g" forces to indicate the level of force as compared to the force of gravity at sea level. The structure of FIG. 5 not only increases the lateral shock survivability of the sensor over the structure of FIG. 2, but also decreases the level of stress on the springs by a few orders of magnitude even under normal operation where no lateral shock forces are applied.

At least three major differences may be observed between the alternative spring 72 arrangement of sensor structure 10' of FIG. 5 as compared to the sensor structure of 10' of FIG. 2.

First, the inside radius $R_1$ of the spring 72 where the spring 72 is connected to the proof mass 16' is greater for the spring arrangement of the sensor structure 10' of FIG. 5 as compared to the corresponding connection of spring 32 to mass 16 of FIG. 2. Likewise, the outside radius $R_2$ where the spring 72 is connected to the frame 18' is greater for the spring arrangement of the sensor structure 10' of FIG. 5 as compared to the corresponding connection of spring 32 to frame 18 of FIG. 2. Because the radii $R_1$ and $R_2$ of the structure of FIG. 5 are greater than corresponding radii of spring connections of FIG. 2, the annular space between frame 18' and mass 16' is greater than the corresponding annular space between frame 18 and mass 16 of FIG. 2. A great advantage of the spring structure of FIG. 5 over that of FIG. 2 is that stress concentrations at the connection locations of spring to mass and spring to frame are greatly reduced. In addition, the radii $R_3$ and $R_4$ of alternative spring structure of FIG. 5 are significantly enlarged (as compared to the structure of FIG. 2) to alleviate stress concentration around the elbow area which result from high lateral g forces.

Second, the width of the spring 72 varies as a function of its length from connection 74 at mass 16' to connection 73 at frame 18'. Such width is greater at the connection locations 74 and 73 than at the location where the spring 72 "bends" or curves about the mass corner 29. The effect of such varying width of spring 72 is to distribute stress more evenly along the length of the spring when the springs 72 are under lateral load.

Third, the space or gap G between two adjacent springs 72, at their respective connection locations 74 and 73 of the structure of FIG. 5 is reduced as compared to corresponding connection locations of springs 38 of FIG. 2. Likewise the gaps G' and G" between the spring 72 and the frame 18' side and the spring 72 and the mass 16' side are greatly reduced for the structure of FIG. 5 as compared to the corresponding gaps for the structure of FIG. 2. The narrow gaps G, G' and G" serve an important function in preventing excessive movements of the springs in response to high g lateral forces. Vertical, horizontal and diagonal forces in the lateral plane of the structure of FIG. 5 all cause springs 72 to move a small distance in response to such force. But the small gaps cause a corresponding frame edge or mass edge or adjacent spring to act as a stop to prevent the spring leg from moving a distance greater than the yield point of the spring material. In other words, the gap distances G, G' and G" are selected to be less than the maximum distance that the springs may move before they break. Under excessive lateral g loading, the spring mass structure should hit the stops at the same time. The mass will hit a spring, and one adjacent second spring will hit the frame, and a third spring will hit the second spring all at the same time.

Finally, as illustrated in FIG. 5, spring 72 defines an acute angle α as it nears mass 16' toward its connection 73 of frame 18'. Such angle α prevents spring 72 from contacting a corner of mass 16' when deflected by certain lateral forces. The acute angle α also ensures that when the structure is experiencing high lateral g forces and if the mass 16' should touch the spring 72, it will only touch the area of the spring that is rigidly attached to the frame 18' and not a higher stress area along the intermediate thinner section of the spring.

Design factors which influence the selection of gap distances, spring thickness (see FIG. 3 for example), etc. are:

(1) The maximum thickness of spring material which can be produced in the fabrication process;

(2) The narrowest gap distance which can be achieved by plasma etching of springs;

(3) The maximum g lateral loading which may be anticipated;

(4) The width of separation distances between mass and frame;

(5) An aspect ratio (width/thickness) which prevents buckling of the spring 72 before hitting stops; and (6) Tuning of the spring mass combination to a desired operating frequency and acceptable higher modes.

EXAMPLE

The design parameters of the design of silicon structures FIG. 5 are as follows:

| | |
|---|---|
| spring thickness | 31.8 μm |
| mass deflection under 1 g gravity field | .367 μm |
| highest stress under 1 g normal operating conditions (2.5 times improvement over FIG. 2 for an identical stiffness) | .0777 dynes/μm$^2$ |
| maximum stress under 10,000 g lateral force and 10 g vertical force (5.5 times improvement over FIG. 2 for identical stiffness) | 26.7 dynes/μm$^2$ |
| maximum lateral movement of mass under conditions of 10,000 g lateral force and 10 g vertical force | 11.6 μm |
| maximum gap distance (mass can move 26.0 μm before spring breaks because of yield stress of silicon of 60 dynes/μm$^2$) | 26.0 μm |
| shock resistance value as compared to design of FIG. 2 | 2 |

Although it is preferred to connect the ends of the springs at the middle of the edges of top and bottom surfaces 22, 24 for the reasons described above, the springs may be connected off such center point, even toward the ends of the edges of top and bottom surfaces 22, 24. In that case, the springs 72 would have legs of greater unequal length than for the preferred designs as illustrated where the spring legs 72 are of almost equal length.

The preferred method for constructing the mass and frame structure is by semiconductor fabrication techniques. The mass and frame are separately produced as mirror image halves by ODE etch techniques. The two halves are then bonded together to form the complete mass 16 and frame 18 (or mass 16' and frame 18' of FIG. 5). Spring elements, for connecting the mass to the frame, are preferably made of silicon. The process for constructing L-shaped spring 32 or elbow-shaped spring 72 is described in a co-pending U.S. patent application 08/218,363 filed on Mar. 28, 1994 entitled *Method for Fabricating Suspension Members for Micromachine Sensors*, which is assigned to the assignee of this application. Such application is incorporated by reference herein for the description as to the preferred manner of fabricating springs.

Figure 3:
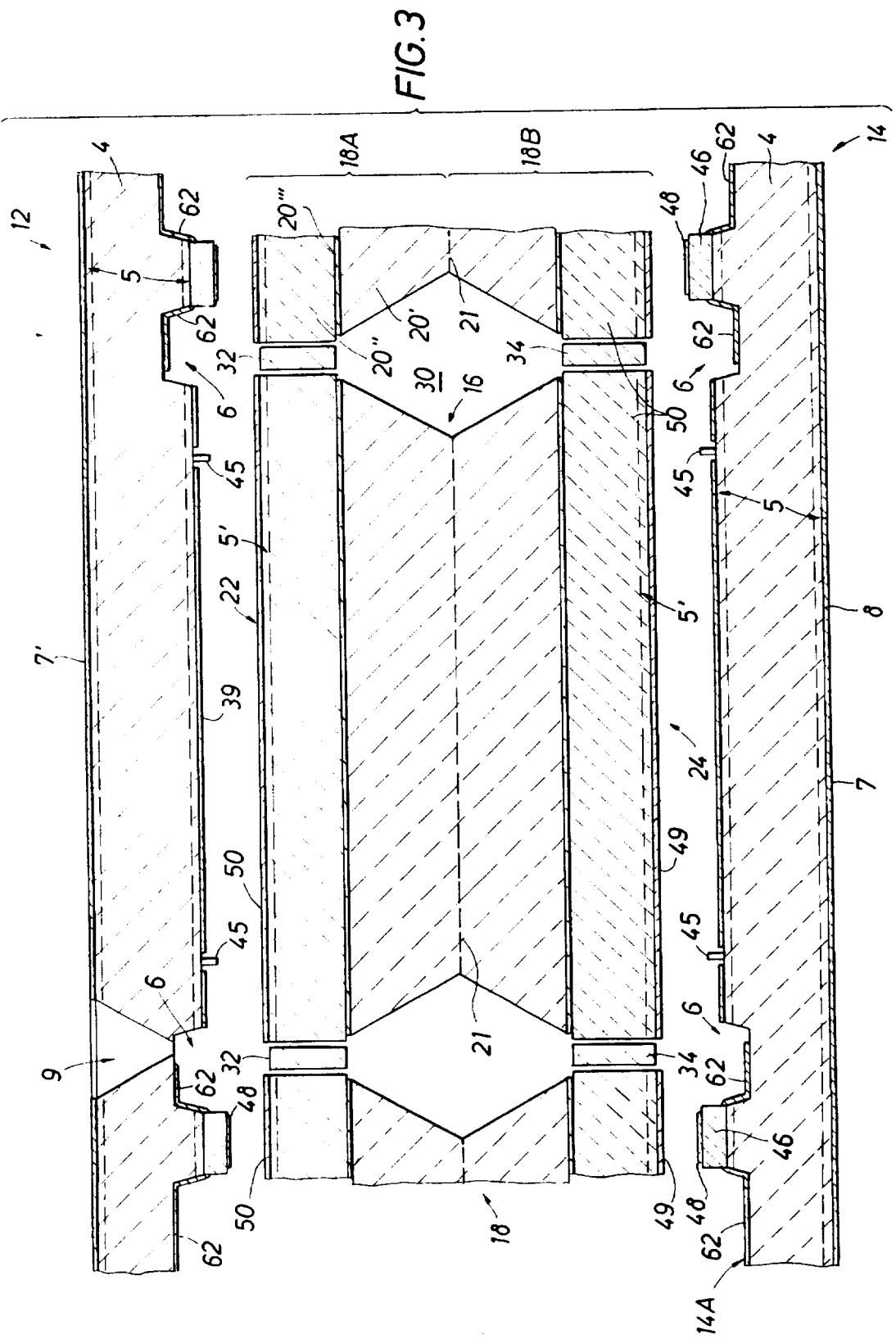
FIG. 3 is a vertical cross-sectional view of the sensor assembly.

FIG. 3 is a cross-sectional view of frame 18 and top and bottom covers 12, 14. Such cross-sectioned view applies as well to the embodiment of FIG. 5, but of course dimensions of the spring legs and annular space vary between the designs of FIGS. 2 and 5. The frame 18 includes top and bottom portions 18A, 18B. Portion 18A includes a bottom layer 20' of bulk silicon p$^-$ material and a top layer 20" of EPI silicon p$^+$ material. A layer 20''' of epi p$^{++}$ germanium separates layer 20' and layer 20" during the production process. Corresponding layers of bottom portion 18B are identical to those described for the top portion 18A of frame 18. A silicon fusion bond 21 is shown in dashed lines to indicate that top portion 18A is fused to its mirror image portion 18B to form frame 18. The central mass 16 includes the same portions as described for frame 18.

Top cover 12 is constructed in identical fashion as bottom cover 14. Top and bottom covers 12, 14 are mirror images of each other, except for an electrode connection structure over the bottom cover 14. Accordingly, only the bottom cover 14 is described below.

Cover 14 is fabricated of bulk silicon of p$^-$ as indicated by reference number 4. A p$^+$ diffusion layer 5 may be provided where necessary to prevent Schotky diode effects. Depressions 6 are provided to correspond to the position of springs 32, 34 of the frame-spring-mass 18, 34, 16 assembly as described above. The depressions 6 provide greater distance between springs and covers so as to minimize electrostatic influence of the springs of the structure. A metal layer 7 on the bottom cover 14 provides a bottom electrode contact for the sensor. A metal layer 7' is provided on the top cover 12 to provide a top electrode contact for the sensor. Vertical stops 45 and vertical extensions 46 are formed of silicon dioxide.

Vertical seal ring extensions 46 have oxide layers 62 which surround the outside of the seal ring prevent shorting between frame 18 and top and bottom covers 4 from loose particles that happen to lodge between the frame 18 and covers 4 during wafer dicing operations. The oxide layer 62 within the depressions 6 prevents the springs 32, 34 from shorting to the top and bottom cover plates 12 and 14. A metal layer 48 is provided on the surfaces of seal ring extension 46 which face the spring-mass-support structure. A metal layer 49 is provided on the bottom surface of frame 18 and mass 16. The bottom cover 14 is bonded at layer 48 to the frame 18 by gold to gold thermo-compression bond method. In a corresponding manner, top cover 12 is bonded to the top metal layer 50 of frame 18. A vent 9 is provided in top cover 12 (or alternatively in bottom cover 14) to produce a vacuum within the top and bottom covers so as to prevent air molecules or contaminants from interfering with the movement of mass 16 with respect to frame 18 and with respect to top and bottom covers 12, 14. According to the preferred embodiment of a sensor which embodies the invention, vent 9 is not plugged, because a package may be provided to envelope the sensor, thereby preventing air from invading the spaces between covers 12 14 and the frame-spring-mass 18, 34, 16. Vent 9 may be plugged after a vacuum is produced, where an enveloping package is not provided. Metal may be deposited on the springs 34 so as to form a conductive path from the electrode at 14A to frame 18 to the metal layer 49 of mass 16.

In the preferred embodiment of the structure of FIG. 3, the metal layers 7, 7' for top electrode contacts comprises multiple layers of titanium (500A), nickel (1500A) and gold (6000A). The metal layers 48, 49 preferably comprise multiple layers of titanium—tungsten (500A) and gold (6000A). The seal vertical ring extensions 46 preferably rise about 1.75 μm above and below covers 4. The thickness of oxide layers 62 is preferably about 2 μm. The resistivity of silicon P$^-$ covers 4 and layers 20' is preferably about 0.03–0.05 ohms cm. The implants 5 of top and bottom covers 12 and 14 are preferably p$^+$ implants (about $8 \times 10^{18}$ cm$^3$)(p$^+$ molecules/cm$^3$). Similar implants 5' of layers 20''' are provided.

Figure 4:
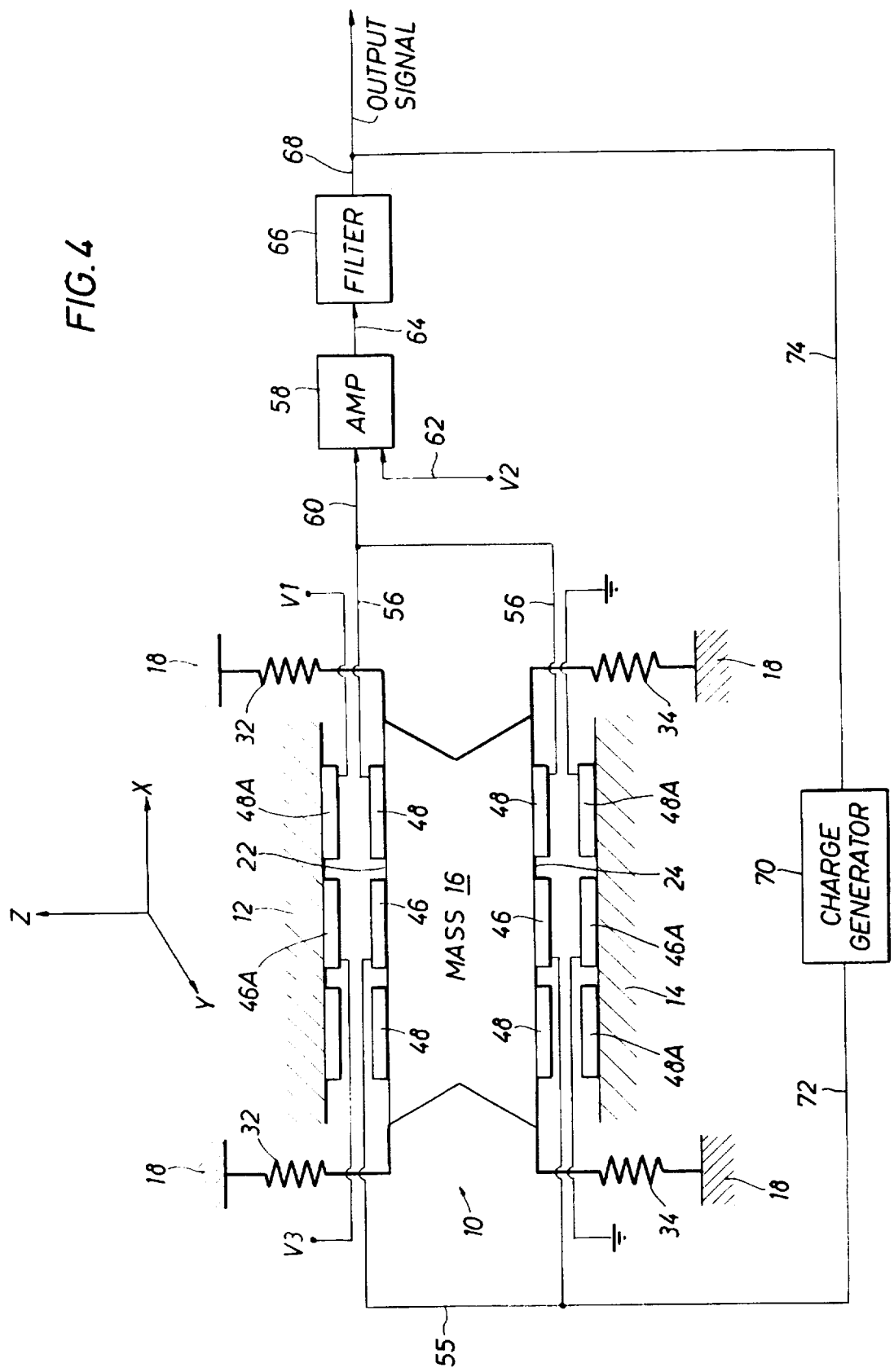
FIG. 4 is a schematic illustration of a feedback control system for detecting forces applied to the sensor assembly.

As an example of the sensor structure usage in an accelerometer arrangement, FIG. 4 shows one preferred embodiment of the invention with force conducting areas 46 formed on opposed surfaces or faces 22, 24 of mass 16. Sense conducting areas 48 on faces 22 24 surround force conducting areas 46. Areas 46 and 48 are electrically isolated from each other with suitable insulating guards. Corresponding force and sense conducting areas 46A and 48A are formed on adjacent top and bottom covers 12 14. Lead 55 connects force conducting areas 46 on opposed faces 22 24 of mass 16. A d.c. voltage V1 is applied between sense conducting areas 48A of opposed covers 12 14 and is of a predetermined magnitude. Leads 56 are connected to all sense conducting areas 48 of mass 16 and extend to a differential amplifier 58 via input lead 60.

The voltage appearing on lead 60 is related to the position of mass 16 relative to upper and lower covers 12 and 14, because sense conducting areas 48 of mass 16 are disposed in the path of electric field between covers 12 14 caused by voltage V1. When mass 16 moves toward the area 48A of upper cover 12, the voltage on sense area 48 and lead 60 approaches the magnitude of voltage V1; and conversely, when mass 16 moves toward lower plate 14, the voltage on sense area 48 approaches zero magnitude or ground. A reference d.c. voltage V2 of a predetermined magnitude is applied via input lead 62 to amplifier 58. As a result, the output signal on output lead 64, which is connected to filter 66, is a sense displacement signal proportional to the distance that mass 16 has moved from a reference position. The displacement signal on output lead 64 is filtered through filter 66 and results in an output signal from lead 68.

A d.c. voltage V3 of a predetermined magnitude is connected to force conducting area 46A on upper cover 12. Voltage V3 can be same or different magnitude as voltage V1. Voltage V3, applied between force conducting areas 46A on upper and lower plates 12 14, creates a force electric field across force conducting areas 46 of mass 16. A negative feedback circuit is illustrated by charge generator 70 which produces an output signal on its output lead 72 in response to the output displacement signal from lead 74 to apply an amount and magnitude of electric charge on force conducting areas 46 to move mass 16 toward its reference position, normally halfway between upper and lower plates 12, 14. Such a charge generator circuit is disclosed in an above-mentioned U.S. Pat. No. 4,922,756 to Henrion, which is incorporated by reference herein.

A force applied to sensor assembly 10 causes displacement of mass 16 from its reference position. The displacement of mass 16 causes charge generator 70 to generate a charge on conducting areas 46 thereby returning mass 16 to its reference position. The displacement of mass 16 is directly proportional to the force. Accordingly, the output signal from lead 68 is an analog signal proportional to the force for force frequencies below the effective resonant frequency of sensor assembly 10. The output signal can be received at a remote location for measurement or conversion to a suitable digital signal.

Other circuits and methods may be provided for measuring acceleration (or other motion attributes) similar to that of FIG. 4. Reference may be made to U.S. Pat. No. 4,922,756 to Henrion for further details of suitable arrangements to measure acceleration with a frame-spring-mass structure, the entire disclosure of which is incorporated herein.

An alternative preferred embodiment of an accelerometer is similar to that of FIG. 4, but only one conducting surface is applied to each of the top and bottom surfaces 22, 24 of mass 16 and each facing surfaces of covers 12, 14. Sense signals are received from the top and bottom surfaces 22, 24 and force signals are applied to such top and bottom surfaces 22, 24 separated in time, by multiplexing. Furthermore, filter 66 of the forward loop illustrated in FIG. 4 may include an integrator such that a sigma-delta-modulation system can be provided as discussed in the above mentioned Henrion patent, incorporated herein.

A new and improved sensor structure has been disclosed which meets all of the objectives of the present invention and incorporates numerous unique features and advantages as set forth herein. Because certain changes or modifications may be made in the disclosed embodiment without departing from the inventive concepts involved, it is the aim of the appended claims to cover all such changes and modifications falling within the present invention.

What is claimed is:

1. An improved sensor structure having a frame, a moveable mass, four L-shaped springs which include a first leg joined to a second leg at a juncture region, where said first leg of each L-shaped spring is connected only to a side of the frame but not to said mass at a frame connection region and said second leg of said each L-shaped spring is connected only to a side of said mass but not to said frame at a mass connection region, and said juncture region of each of said L-shaped springs is positioned in a juncture space formed between the frame and the mass, and said frame connection region and said mass connection are characterized by widths which are greater than a width which characterizes said juncture region, where said four L-shaped springs are characterized by a lateral deflection breaking distance, and wherein an outer edge of each of said four L-shaped springs is separated by a lateral spring—spring gap distance from an inner edge of an adjacent spring, where said lateral spring—spring gap distance is less than said lateral deflection breaking distance.

2. The improved sensor structure of claim 1 wherein each of said four L-shaped springs is further characterized by an aspect ratio designed and arranged to prevent buckling for lateral movements of each of said four L-shaped springs through said lateral spring—spring gap distance.

3. The improved sensor structure of claim 1 wherein an outer edge of each of said L-shaped springs is separated by a lateral spring-support gap distance from a side of said frame, where said lateral spring-support gap distance is less than said lateral breaking distance.

4. The improved sensor structure of claim 3 wherein each of said four L-shaped springs is further characterized by an aspect ratio designed and arranged to prevent buckling for lateral movements of each of said L-shaped springs through said lateral spring-support gap distance.

5. The improved sensor structure of claim 1 wherein an inner edge of each of said L-shaped springs is separated by a lateral spring-mass gap distance from a side of said mass, where said spring-mass gap distance is less than said lateral breaking distance.

6. The improved sensor structure of claim 5 wherein each of said four L-shaped springs is further characterized by an aspect ratio designed and arranged to prevent buckling for lateral movements of each of said L-shaped springs through said lateral spring-mass gap distance.

7. An improved sensor structure having a frame, a moveable mass, four L-shaped springs which include a first leg joined to a second leg at a juncture region, where said first leg of each L-shaped spring is connected only to a side of the frame but not to said mass at a frame connection region and said second leg of said each L-shaped spring is connected only to a side of said mass but not to said frame at a mass connection region, and said juncture region of each of said L-shaped springs is positioned in a juncture space formed between the frame and the mass, said frame connection region and said mass connection are characterized by widths which are greater than a width which characterizes said juncture region, said first leg of each of said four L-shaped springs has a first curved shape with each said first leg being connected perpendicularly to said frame at said frame connection region and with said first curved shape of said first leg also forming an inside acute angle with said moveable mass and gradually curving from said frame connection region to said juncture region, and said second leg of each of said four L-shaped springs has a second curved shape with each said second leg being connected perpendicularly to said mass at said mass connection region and gradually curving from said mass connection region to said juncture region.

8. An improved sensor structure having a frame, a moveable mass, four L-shaped springs which include a first leg joined to a second leg at a juncture region, where said first leg of each L-shaped spring is connected only to a side of the frame but not to said mass at a frame connection region and said second leg of said each L-shaped spring is connected only to a side of said mass but not to said frame at a mass connection region, said juncture region of each of said L-shaped springs is positioned in a juncture space formed between the frame and the mass, said L-shaped springs are characterized by a lateral deflection breaking distance, an outer edge of each of said L-shaped springs is separated by a lateral spring-support gap distance from a side of said frame, where said lateral spring-support gap distance is less than said lateral breaking distance, an inner edge of each of said L-shaped springs is separated by a lateral spring-mass gap distance from a side of said mass, where said spring-mass gap distance is less than said lateral breaking distance, and an outer edge of each of said four L-shaped springs is separated by a lateral spring—spring gap distance from an inner edge of an adjacent spring, where said lateral spring—spring gap distance is less than said lateral deflection breaking distance.

9. The improved sensor structure of claim 8 wherein each of said four L-shaped springs is further characterized by an aspect ratio designed and arranged to prevent buckling for lateral movement of each of said L-shaped springs through said lateral spring—spring gap distance and through said lateral spring-support gap distance and through said lateral spring-mass gap distance.

10. An improved sensor structure having a frame, a moveable mass, four L-shaped springs which include a first leg joined to a second leg at a juncture region, where said first leg of each L-shaped spring is connected only to a side of the frame but not to said mass at a frame connection region and said second leg of said each L-shaped spring is connected only to a side of said mass but not to said frame at a mass connection region, said juncture region of each of said L-shaped springs is positioned in a juncture space formed between the frame and the mass, said L-shaped springs are characterized by a lateral deflection breaking distance, an outer edge of each of said L-shaped springs is separated by a lateral spring-support gap distance from a side of said frame, where said lateral spring-support gap distance is less than said lateral breaking distance, said first leg of each of said four L-shaped springs has a first curved shape with each said first leg of each of said four L-shaped springs being connected perpendicularly to said frame at said frame connection region and with said first curved shape of said first leg of each of said four L-shaped springs also forming an inside acute angle with said mass and gradually curving from said frame connection region to said juncture region, and said second leg of each of said four L-shaped springs has a second curved shape with each said second leg of each of said four L-shaped springs being connected perpendicularly to said mass at said mass connection region and gradually curving from said mass connection region to said juncture region.

11. An improved sensor structure having a frame, a moveable mass, four L-shaped springs which include a first leg joined to a second leg at a juncture region, where said first leg of each L-shaped spring is connected only to a side of the frame but not to said mass at a frame connection region and said second leg of said each L-shaped spring is connected only to a side of said mass but not to said frame a mass connection region, and said juncture region of each of said L-shaped springs is positioned in a juncture space formed between the frame and the mass, said first leg of each of said four L-shaped springs has a first curved shape with each said first leg being connected perpendicularly to said frame at said frame connection region and with said first curved shape of said first leg also forming an inside acute angle with said mass and gradually curving from said frame connection region to said juncture region, and said second leg of each of said four L-shaped springs having a second curved shape with each said second leg being connected perpendicularly to said mass at said mass connection region and gradually curving from said mass connection region to said juncture region.

12. The improved sensor structure of claim 11 where said L-shaped springs are characterized by a lateral deflection breaking distance, and wherein an outer edge of each of said L-shaped springs is separated by a lateral spring-support gap distance from a side of said frame, where said lateral spring-support gap distance is less than said lateral breaking distance, and an outer edge of each of said four L-shaped springs is separated by a lateral spring—spring gap distance from an inner edge of an adjacent spring, where said lateral spring—spring gap distance is less than said lateral deflection breaking distance.

13. The improved sensor structure of claim 11 where said L-shaped springs are characterized by a lateral deflection breaking distance, wherein an outer edge of each of said L-shaped springs is separated by a lateral spring-support gap distance from a side of said frame, where said lateral spring-support gap distance is less than said lateral breaking distance, and an inner edge of each of said L-shaped springs is separated by a lateral spring-mass gap distance from a side of said mass, where said spring-mass gap distance is less than said lateral breaking distance.

* * * * *